United States Patent [19]

Parker

[11] Patent Number: 4,805,188

[45] Date of Patent: Feb. 14, 1989

[54] TIME-TEMPERATURE INDICATOR

[76] Inventor: Robert Parker, 411 Rolling La., Alamo, Calif. 94507

[21] Appl. No.: 751,792

[22] Filed: Jul. 3, 1985

[51] Int. Cl.$^4$ ............................................. G01K 11/12
[52] U.S. Cl. .................................... 374/141; 374/162; 49/342
[58] Field of Search ............... 374/162, 141, 149, 150, 374/165; 116/216, 207; 99/342

[56] References Cited

U.S. PATENT DOCUMENTS

| | | | |
|---|---|---|---|
| 1,515,222 | 11/1924 | Ruben | 374/162 |
| 2,134,759 | 11/1938 | Howlett | 374/141 |
| 2,279,846 | 4/1942 | Stapleton | 374/141 |
| 2,363,075 | 11/1944 | Mattern | 374/165 |
| 3,651,695 | 3/1972 | Brown | 116/207 |
| 3,701,344 | 10/1972 | Walis | 374/162 |
| 3,736,861 | 6/1973 | Kroyer | 374/141 |
| 3,893,340 | 7/1975 | Parker | 116/216 |
| 4,134,299 | 1/1979 | Rueger | 374/141 |
| 4,339,951 | 7/1982 | Yee | 374/162 |

FOREIGN PATENT DOCUMENTS 941685 2/1974 Canada ................ 374/162

Primary Examiner—William A. Cuchlinski, Jr.
Attorney, Agent, or Firm—Shyamala T. Rajender

[57] ABSTRACT

A time-temperature indicator, particularly adapted for use with closed sterilizing or cooking vessels, such as pressure cookers and sterilizers, to indicate at what temperature and for how long material contained within the vessel has been heating or cooking, is disclosed. The indicator uses a material such as a thermochromic material which changes color at a predetermined temperature, and is constructed to provide readings around a 360° angle. The indicator may, for example, be constructed as a knob on the lid of a pressure cooker or sterilizer or the link or may be attached to or as a replacement for an existing knob.

25 Claims, 2 Drawing Sheets

TIME-TEMPERATURE INDICATOR

BACKGROUND OF THE INVENTION

The present invention relates to time-temperature indicators, particularly to time-temperature indicators of the type utilizing thermochromic material. More particularly, it relates to time-temperature indicators for use with closed or sealed heating or cooking vessels such as pressure cookers and sterilizers or lids on pots and pans.

The use of different types of mechanical and electrical timers to indicate how long something has heated or how long a pressure cooker, for example, has been cooking, are well known. However, when more than one vessel or cooker is in operation simultaneously, it becomes difficult to time all these vessels with only one timer. Besides, these prior art timers are expensive and cannot compensate for varying boiling points at different altitudes.

Temperature indicating devices using thermochromic material are known in the prior art. These devices utilize thermochromic material in which the material goes through a spectrum of color changes at different temperatures. These prior approaches incorporate thermochromic materials deposited in the shape of numbers or are sheet material which gives out readouts or color changes at predetermined temperatures depending on the precise composition of the material. However, these prior known indicators are not capable of determining internal temperatures of a vessel or pot after a given length of time.

Another prior art effort using thermochromic materials as a time-temperature indicator is described and claimed in U.S. Pat. No. 4,137,769 issued Feb. 6, 1979 to R. Parker. It involves a method and apparatus for determining the internal temperature of an object such an egg. The thermochromic material of that indicator is enclosed within a transparent member having physical dimensions, thermal conductivity and diffusivity characteristics selected to provide a thermal analog of the associated object being tested. The indicator has also to be immersed in the heating fluid. In addition, indicators of this type must be placed within or inside an open vessel or in one with a transparent top, along with the object being checked or tested. Such indicators, therefore, cannot be utilized for applications such as heating or heated vessels or pressure cookers and the like where the material therein is not visible from the outside or exterior of the vessel.

Thus a need exists for a time-temperature indicator by which one can readily determine the temperature of the material within a sealed or closed vessel after a finite period of time.

SUMMARY OF THE INVENTION

Accordingly, it is an object of the present invention to provide a time-temperature indicator for closed or sealed vessels.

A further object of the invention is to provide an indicator for determining the temperature of material within a closed vessel over a period of time.

Another object of the invention is to provide a time-temperature indicator which can be used as a knob or lifting means for a lid of a container or vessel while providing a 360° angle for readout of the temperature of the material within the container.

Another object of the invention is to provide a time-temperature indicator that can be retained on the lid of a vessel and constructed to provide a 360° angle readout of the temperature of material contained within the vessel.

Another object of the invention is to provide a time-temperature indicator which utilizes thermochromic material and is constructed to provide a 360° angle readout of the temperature of material within a closed heated vessel.

Additional objects, advantages and novel features of the invention, together with additional features contributing thereto and advantages accruing therefrom will be apparent from the following description of a preferred embodiment of the invention which is shown in the accompanying drawings, which are incorporated herein by reference and form an integral part hereof. The objects and advantages of the invention may be realized and attained by means of the instrumentalities and combinations particularly pointed out in the appended claims.

To achieve the above objects and in accordance with its purpose, the present invention provides a time-temperature indicator for heated vessels, such as those used for sterilizing objects or in cooking food, whereby the temperature of material within the vessel can be readily determined over a specific time period. The indicator of the present invention provides for readout of the temperature over a 360° angle and utilizes material such as a thermochromic material which changes color at a predetermined or selected temperature. For example, mercurous oxide, which is bright red in color undergoes a reversible phase change and turns black at about 70° C., when heated. A cholesteric type liquid crystal material may also be used as the temperature indicator.

One embodiment of the time-temperature indicator of the present invention may, for example, basically consist of a transparent cylinder having a layer or film of thermochromic material on the inner surface thereof, with one end being in direct thermal contact with the lid of a closed vessel such as a pressure cooker, sterilizer and the like, and the opposite end being closed as by a cap or cover. As the temperature of the contents in the vessel increases to a specified level, the thermochromic material changes color, such color change being readable entirely around the transparent cylinder which has a 360° visual angle. The transparent cylinder may be attached as a lifting knob for the lid or retained on the lid as by a spring biased means connected to an existing associated knob, the spring biased means providing the necessary thermal contact of the thermochromic material with the surface of the lid. The transparent cylinder may also be magnetically attached as a lifting knob for the lid or retained on the lid by means of a magnetic plate positioned under the indicator unit, with another magnetic plate secured to the top surface of the lid to provide the necessary magnetic contact. The thermochromic material may be reversible or irreversible and may be used to record temperature change over a period of time or to record the occurrence of an event such as the attainment of a certain preselected temperature.

DETAILED DESCRIPTION OF THE INVENTION

The instant invention is directed to a time-temperature indicator for closed vessels, such as those used for sterilizing or cooking. Instead of the standard knob or lifting device used on most lids of sterilizing and cooking vessels and in the place of pressure and temperature indicators located elsewhere on the lid, such as those commonly used in pressure cookers, the invention provides a unique lifting knob which additionally serves as a time and temperature indicator. The indicator-containing lifting knob of the present invention can replace existing knobs on the lids of vessels or can be retained on the lid by a spring bias arrangement secured to the existing lifting knob or magnetically attached as a lifting knob for the lid or retained on the lid by means of a magnetic plate positioned under the indicator unit, with another magnetic plate secured to the top surface of the lid to provide the necessary magnetic contact.

The thermochromic material may be reversible or irreversible depending on the use. The reversible material is suitable for use to record change in temperature as a function of time and the irreversible material is suitable where a permanent record in needed for a given event such as the attainment of a predetermined or preselected temperature. Two separate knobs, one incorporating the reversible thermochromic material and the other incorporating the irreversible material may also be simultaneously used on the same heating vessel. One could serve as a recording device and the other could serve as an indicating device simultaneously.

Figure 1:
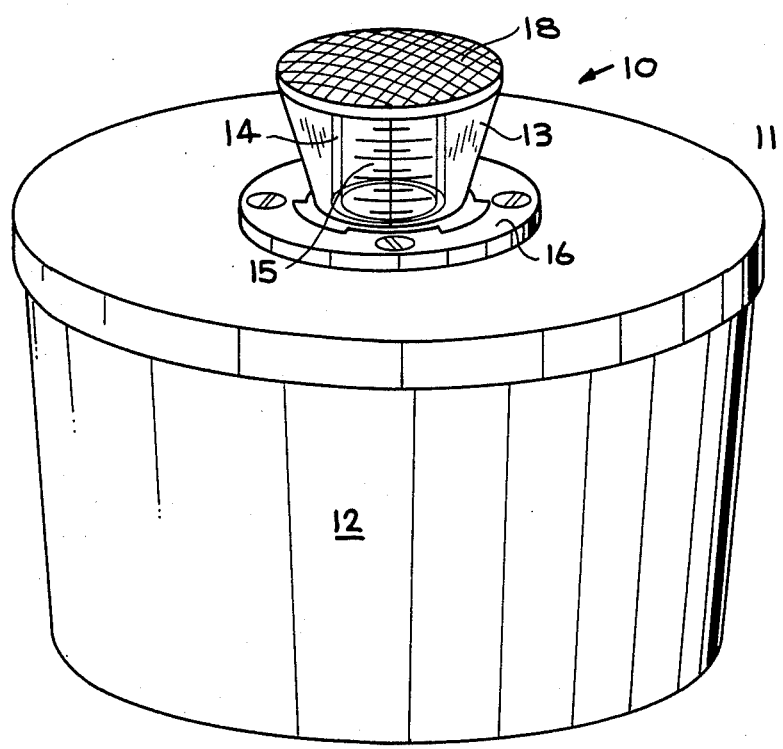
FIG. 1 illustrates the time-temperature indicator of the subject invention mounted on a lid of a vessel, such as a pressure cooker.
Figure 2:
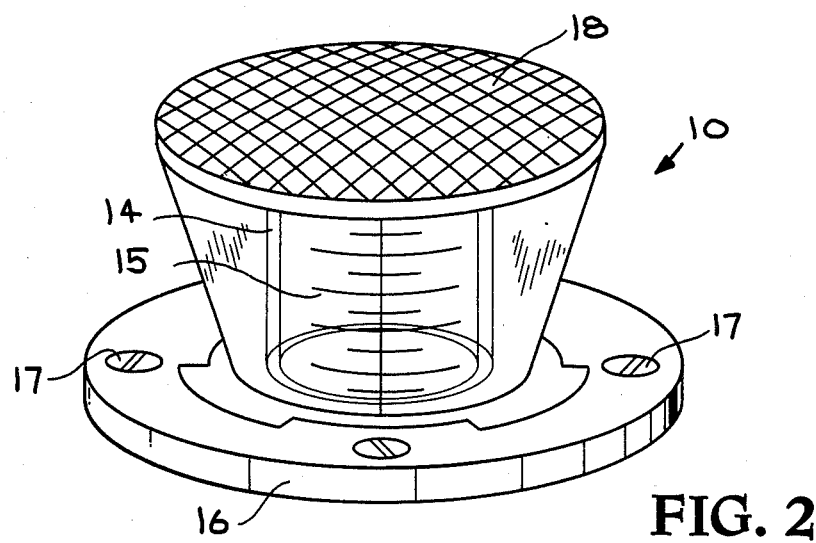
FIG. 2 is an enlarged view of the indicator of FIG. 1.

Referring to the embodiments shown in FIGS. 1 and 2, the subject indicator, generally indicated at 10, is secured to a lid 11 of a vessel 2, such as a pressure cooker. The indicator 10 comprises a transparent hollow outer member 13 in the shape of a cylinder, prism or cone with a layer or film 14 of a thermochromic material secured to or deposited on an inner member 15 in the shape of a cylinder, prism or cone, the film 14 having temperature calibration lines or other readout means imprinted thereon. The inner cylinder 15 and film 14 are pressed into the outer cylinder 13. For better optical index matching, a film of oil or grease can be placed between the thermochromic film 14 and inner and outer cylinders 13 and 15. The film may also be attached by means of an adhesive. The outer cylinder, prism or cone 13 is secured to a base member 16 having four apertures (only three shown in the diagram) through which are positioned screws 17 for securing or attaching the indicator 10 to lid 11 so that there is good thermal contact between the lid 11 and the thermochromic film 14. The screws 17 can be omitted or replaced by the base member 16 which may be constructed of magnetic material. To assure such thermal contact, the film 14 may extend slightly beyond the end of outer cylinder, prism or cone 13. A cap or end member 18 is secured to the opposite end of cylinder 13.

By way of example, the transparent inner and outer cylinder, prism or cone 13 and 15 may be constructed from acrylic or polycarbonate material which are poor thermal conductors. The thermochromic film 14 may be made from a layer of material such as polyester, or polycarbonate, coated, printed or impregnated with a thermochromic material such as mercurous oxide, or other mercurous salt, thermochromic polyacetylene and the like. Film 14 may also utilize cholesteric liquid crystals, which change color at selected temperatures, such as those disclosed in U.S. Pat. Nos. 4,137,769, 4,022,706 and 3,600,060 which disclosures are incorporated herein by reference and made a part hereof and those disclosed in copending U.S. patent application, Ser. No. 723,329 filed Apr. 15, 1985. Some of these include cholesteryl chloride, cholesteryl oleyl carbonate, cholesteryl bromide, cholesteryl acetate, cholesteryl nanoate, cholesteryl oleate, cholesteryl caprylate, and the like. By way of specific example, the film 14 may be coated, printed or impregnated with mercurous oxide which changes from a bright red to black at about 70° C., with a transition range of about 3°-4° C. The base 16 and cap 18 may be constructed of appropriate plastic or other material such as acrylic or polycarbonate or polysulfone and the like. Also, as shown in FIG. 2, a highly heat conductive member or washer 19 may be positioned intermediate the film 14 and the lid 11 or within the lower end of the film. The clarity of the delineating line of color change is also improved by the choice of the thermochromic material such that the transition temperature is within $\frac{1}{2}$° C. range rather than a 3°-4° C. range as with mercurous oxide.

While the FIG. 1 embodiment has been described as utilizing an inner cylinder, prism or cone 15 to support film 14, such cylinder may be omitted and if desired for film support purposes, may be replaced by an insulative foam such as polyurethane, or polyimide or by a conductive layer using any suitable conductive materials including but not limited to metals such as stainless steel, nickel, lead and the like. A conductive material is preferred because with the use of a conductive material core, the traverse of the color change is greatly increased.

As an example, if water or some other liquid is being heated or some food item is being cooked in vessel 12 of FIG. 1, steam that is generated inside condenses on the inner surface of lid 11 causing it to be heated to the temperature of the steam—around 100° C. Assuming that the lid 11 was at room temperature prior to use, heat diffuses into the indicator 10 at a specified time rate depending on the heat conductivity characteristics of the lid 11. Such temperature distribution curves or plots for various materials may be obtained from Carslaw and Jaeger, 2nd Ed. Oxford University Press, 1959. If the film 14 utilizes mercurous oxide which is initially red, a black zone develops at the specified temperature (about 70° C.) and propagates upwardly with time, along cylinder film 14 and cylinder 13. The upward movement of this zone is also dependent on the transition temperature of the thermochromic material. For example, the length of traverse of a material with a color transition temperature of around 70° C. will be less than that of a material with a transition temperature of, say 60° C. This difference in the length of traverse of the color change may be advantageously used to extend measuring periods of time by using a plurality of thermochromic materials to indicate different heating periods. Depending upon the maximum desirable operating temperature of the heated vessel, for example, between 90° C. and 120° C., the transition temperature of the thermochromic material must be in the range of about 55° C. to about 70° C., preferably from about 65° C. to about 70° C. For pressure cookers which are heated to about 121° C., a material with a 70° C.±3° C. transition temperature has been found to be optimal from a series of graphs plotting displacement vs. time. It is desirable that steam generated from the pressure cooker or sterilizer is vented away from the indicator. A deflector may be employed if needed, to prevent the steam from condensing on the indicator and affect the readings.

In order for the indicator 10 to work most effectively, there must be a significant thickness of transparent material (cylinder 13) between the thermochromic film 14 and the ambient temperature so that there is no significant heat loss to the surroundings. The desired thickness depends on the cylinder length, the time to be measured (which is typically about 30 minutes for a pressure cooker) and other factors such as the ambient temperature. There is little movement of the color band if the film 14 is not insulated from the surrounding air and the heat transferred to it from conduction through the base of the lid equals the convection losses from the sides.

The construction of cylinder 13 affords an excellent view of the film 14 around a 360° angle and does not require any particular viewing orientation. While the indicator 10 is shown as using an outer member 13 and an inner member 15 in the shape of a cylinder or cone, other configurations such as cubic or prismatic shapes are equally suitable.

The indicator 10 is sensitive to the temperature of the lid 11, so that at higher altitudes it compensates for lower boiling points such that the upward movement of the color change is not significantly affected by extraneous factors. It also compensates for a decrease in temperature of the lid, such as for example, when the temperature of the heating source is reduced. A metal core used in the construction of the indicator enables the use of thermochromic material with a higher transition temperature making the indicator less sensitive to variations or changes in the ambient temperature.

If the indicator 10 is designed for a specific application, such as for indicating temperature at say ½ hour and 1 hour of heating or cooking time, a second indicator unit may be used to extend the time beyond the ½ hour by using two different thermochromic materials with two different transition temperatures, the one with the lower transition temperature indicating the time during the initial heating period and the one with the higher transition temperature indicating the longer time interval.

Figure 3:
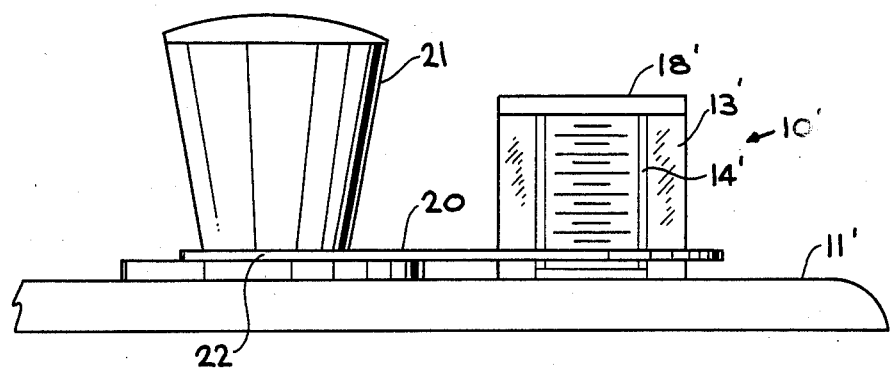
FIG. 3 illustrates the indicator of the invention mounted on a vessel lid via a spring biased member secured to the lifting knob of the lid.

FIG. 3 illustrates an embodiment of the indicator of this invention, which is detachable and which is adaptable for use with existing lids having conventional lifting knobs. The indicator, generally indicated at 10' comprises an outer member 13', configured as a cylinder within which is located a thermochromic film 14' and closed at one end by cap 18'. The cylinder 13' is retained against the surface of a lid 11' by a spring clip 20 mounted to a lifting knob 21 of lid 11'. Spring clip 20 is constructed so as to exert a biasing force on the cylinder toward lid 11', thereby maintaining good thermal contact between the lid 11' and the film 14'. The spring clip 20 is constructed, for example, to include a pair of expandable members 22 (only one shown in the diagram) at one end which are forced about or around the lifting knob 20 for retaining the clip on the knob, and which can be removed by pulling the clip away from the knob, and detaching the indicator from the existing knob of the lid. The embodiment illustrated in FIG. 3 may be modified by securing the outer member 13' to a ring of magnetic material in place of the spring clip 20 which would maintain the indicator 10 securely mounted on lid 11'.

Figure 4:
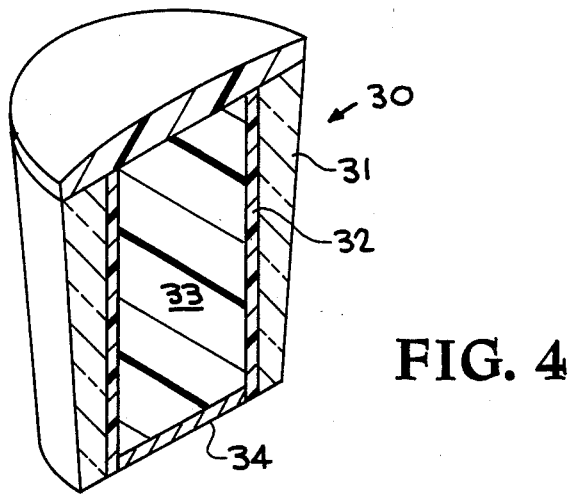
FIG. 4 is an enlarged cross-sectional view of an embodiment of the indicator of the present invention.

FIG. 4 is an enlarged view of another embodiment of the indicator, shown in cross-section to illustrate the construction thereof. This embodiment, generally indicated at 30, comprises a hollow outer transparent cone or tapered cylinder 31 forming a chamber therein, within which is a thermochromic film 32 retained against the inner surface of the cylinder 31 by an insulative foam or conductor 33. If a conductor is used, the conductor may be surrounded by an insulative layer. If a foam is used, the foam may be retained in the cylinder chamber at the lower end by a high heat conductive member or plate 34 positioned within the chamber of cylinder 31, and a cap or end member 35 is secured at the upper or opposite end of cylinder 31. The end cap may be formed integral with the cylinder 31 so as to form a chamber therein. The member 34 may be in abutment with film 32, as shown, or may be within the film such that film 32 extends to at least the end of cylinder 31, or may be omitted if the foam or conductor 33 is of a self-containing or solid type. If desired, the inner surface of cylinder 31 may also be optionally tapered.

By way of example, the indicator 30 may be constructed as follows:

1. Tapered cylinder 31: constructed out of acrylic or polycarbonate material; length of about 1.5 inches; lower outer diameter of about 1 inch; upper outer diameter of about 1.8 inches; chamber diameter of about ⅝ inch; lower wall thickness of about 0.25 inch; upper wall thickness of 0.45 inch.

2. Film 32: constructed of polyester, polyimide, polycarbonate or polysulfone material coated, printed or impregnated with mercurous oxide or a cholesteric liquid crystal or thermochromic polyacetylene; a thickness in the range of about 2 to 3 mils; calibrated along the length in minute increments from 0 to about 30 minutes or to the desired time interval.

3. Foam or conductor 33: constructed of polyurethane or polyimide and the like.

4. Conductive plate 34: constructed out of stainless steel, nickel, lead, sintered metals, thermally conductive ceramics and the like; thickness of about ¼ inch to about 1 inch; and diameter depending on its location in the chamber relative to the film 32.

5. End cap 35: constructed of any type of plastic or acrylic material; diameter of about 1.8 inches; thickness at outer edge of about ⅛ to ¼ inch; secured to cylinder 31 by screws, or an adhesive or glue such as epoxy cement and the like.

While the above listed materials and parameters are only exemplary, the physical size of the indicator may vary depending on the size of the lid on which it is to be positioned. Although a tapered cylinder serves to improve the gripping of the indicator (knob) for lifting the lid to which it is attached, such tapering is not essential and a nontapered cylinder also may be used effectively.

Figure 5:
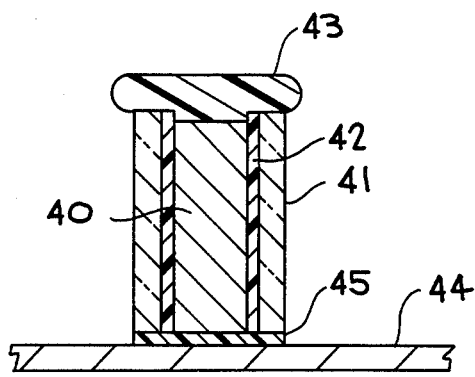
FIG. 5 illustrates another embodiment of the invention.

FIG. 5 illustrates another embodiment of the present invention, the primary difference between this embodiment and those previously described being in the use of a highly conductive member 40 which extends into the outer cylinder 41 for supporting the thermochromic film 42. Cylinder 41 is closed at one end by end cap 43 and secured at the opposite end to a lid 44 of a heated vessel by adhesive indicated at 45, such that there is good thermal contact between lid 44 and conductive member 40.

In the embodiment illustrated in FIG. 5, the heat is transferred from lid 44 to conductive member 40 to film 42, which causes the film 42 to change color as described above.

It has thus been shown that the present invention provides a time-temperature indicator for closed vessels, including opaque vessels, such as pressure cookers, sterilizers and the like, which has ready visibility around a 360° angle and may function as a lifting knob. The subject indicator is insulated from ambient air and has good thermal contact with an associated vessel lid, and has no moving parts. The present indicator can also be readily attached to an existing lid or to a knob of an existing lid. Thus the indicator of the instant invention provides a substantial improvement in the state of the art.

The above embodiments were chosen and described in order to explain best the principles and the practical application of the subject invention thereby to enable those skilled in the art to utilize the invention in various other embodiments and various modifications as are suitable for the particular use contemplated. The foregoing description of a preferred embodiment of the invention has been presented therefore for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device having a readout over 360° angle for indicating the temperature of a material within a closed heating vessel, over a period of time, comprising:
   a transparent member configured as a hollow cylinder;
   a layer of thermochromic material located within and extending entirely around an inner surface of said transparent hollow cylindrical member so as to be visible through said transparent hollow cylinder over a 360° angle;
   means for closing an end of said transparent member; and
   means for maintaining at least said layer of thermochromic material in thermal contact with an associated heating vessel, thereby providing for readout of the temperature over a 360° angle.

2. The device of claim 1, wherein said hollow cylinder includes a continuously tapering outer wall.

3. The device of claim 1, wherein said layer of thermochromic material is constructed of material selected from the group consisting of mercurous salt, thermochromic polyacetylene, and a cholesteric liquid crystal.

4. The device of claim 3, wherein said thermochromic material consists of mercurous salt having a color transition temperature in the range from about 55° C. to about 70° C.

5. The device of claim 1, wherein said layer of thermochromic material is selected from the group consisting of mercurous salt, thermochromic polyacetylene, and cholesteric liquid crystal.

6. The device of claim 1, wherein said means for maintaining thermal contact comprises a base secured to said transparent member, and means for securing said base to an associated heating vessel.

7. The device of claim 1, wherein said means for maintaining thermal contact includes a spring clip mechanism for externally mounting on a lifting member of a lid of an associated heating vessel for retaining said transparent member and said layer of thermochromic material is in physical and thermal contact with an associated heating vessel.

8. The device of claim 1, wherein said means for maintaining thermal contact includes a ring of magnetic material attached to the base of said transparent member and said layer of thermochromic material is in physical and thermal contact with an associated heating vessel.

9. The device of claim 1, additionally including means for retaining said layer of thermochromic material within said hollow transparent member.

10. The device of claim 9, wherein said retaining means comprises a quantity of insulative foam.

11. The device of claim 9, wherein said retaining means comprises a heat conductive member.

12. The device of claim 11, wherein said heat conductive member is located in at least one end of said hollow transparent member.

13. A time-temperature indicator having a 360° readout, particularly applicable for mounting on lids of closed heating vessels, such as pressure cookers, sterilizers, and lids for pots and pans, for indicating the temperature and residence time within the vessel, said indicator comprising:
   a hollow transparent member having an inner surface forming a chamber therein;
   material capable of changing color at specified temperatures located within and extending 360° around said inner surface of said chamber formed in said transparent member; and
   means for maintaining said transparent member on a lid of an associated heating vessel such that said color changing material is in thermal contact with an associated heating vessel, whereby when a temperature change within an associated heating vessel reaches a specified temperature of said material, such material changes color and can be viewed over a 360° angle around said transparent member.

14. The time-temperature indicator of claim 13, wherein said transparent member and said chamber therein each has a generally cylindrical configuration.

15. The time-temperature indicator of claim 14, wherein said color changing material is in the form of a cylindrical film positioned adjacent an inner surface of said cylindrical transparent member.

16. The time-temperature indicator of claim 15, additionally including means for retaining said cylindrical film within said chamber of said cylindrical transparent member.

17. The time-temperature indicator of claim 16, wherein said film is composed of thermochromic material deposited on a substrate.

18. The time-temperature indicator of claim 17, wherein said thermochromic material has a color transition temperature of about 70° C.

19. The time-temperature indicator of claim 13, wherein said transparent member is composed of a hollow cylinder having at least a tapered outer surface and closed at one end by an end cap for forming said chamber.

20. The time-temperature indicator of claim 13, wherein said means includes a spring clip arrangement connected to said transparent member and adapted to be removably secured to an external component of an associated heating vessel.

21. The time-temperature indicator of claim 13, wherein said means includes a member secured to said transparent member and constructed to be secured to an associated heating vessel.

22. The time-temperature indicator of claim 13, wherein said material capable of changing color is composed of a plurality of materials.

23. The time-temperature indicator of claim 13, wherein said plurality of materials have different transition temperatures.

24. The time-temperature indicator of claim 23, wherein said plurality of materials comprises two thermochromic materials.

25. The time-temperature indicator of claim 24, wherein one of said two thermochromic materials undergoes a reversible color change and the other undergoes an irreversible color change.

* * * * *